No. 863,625. PATENTED AUG. 20, 1907.
H. L. MYERS.
TRUCK.
APPLICATION FILED MAY 14, 1906.
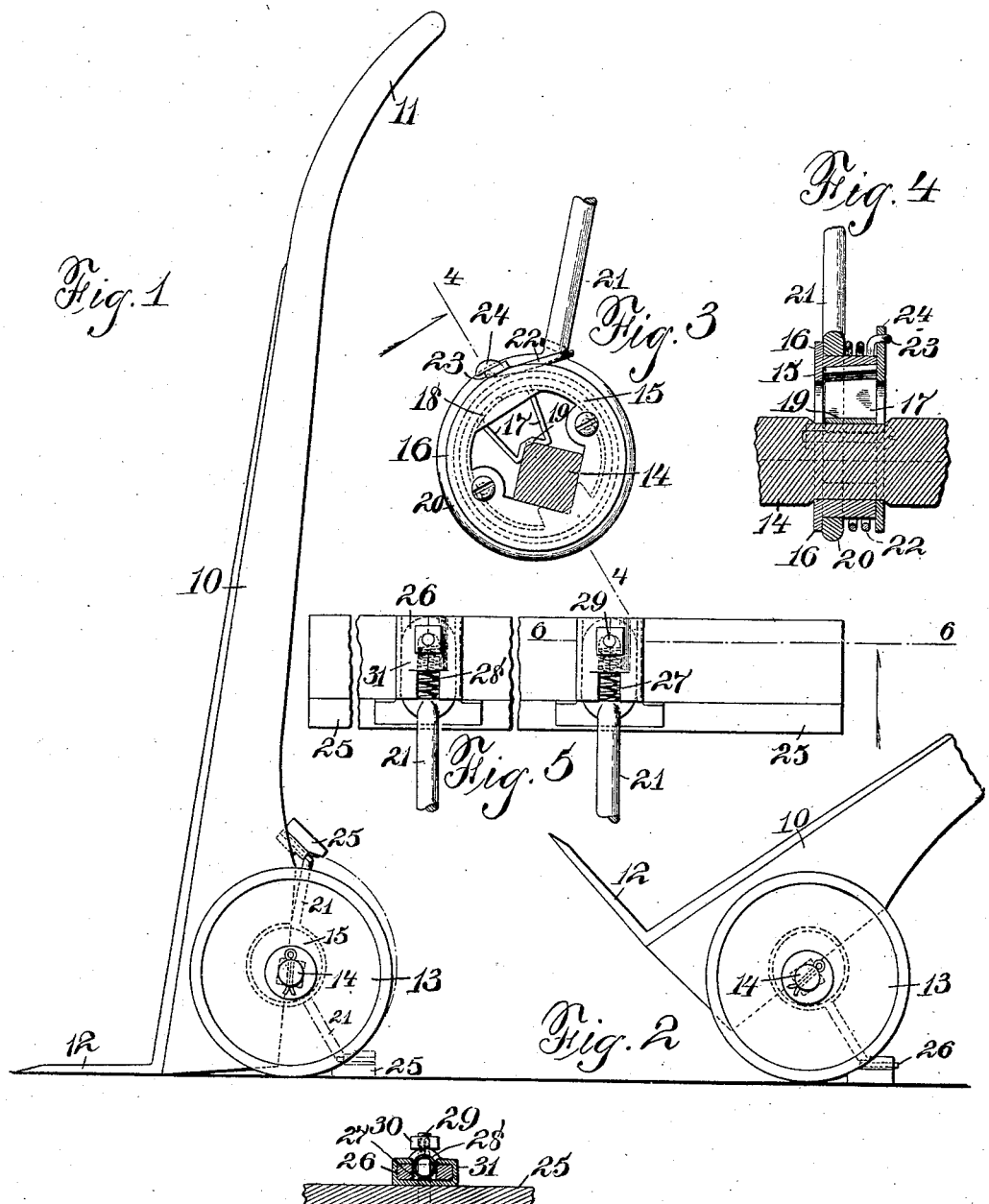
WITNESSES:
INVENTOR
Henry L. Myers
BY
ATTORNEY

UNITED STATES PATENT OFFICE.

HENRY L. MYERS, OF NEWARK, NEW JERSEY.

TRUCK.

No. 863,625.        Specification of Letters Patent.        Patented Aug. 20, 1907.

Application filed May 14, 1906. Serial No. 316,812.

*To all whom it may concern:*

Be it known that I, HENRY L. MYERS, a citizen of the United States, residing at Newark, in the county of Essex and State of New Jersey, have invented certain new and useful Improvements in Trucks; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention is designed to provide improvements on hand trucks, and particularly on the attachment for blocking the wheels disclosed in my patent granted Feb. 14, 1905, No. 782,682.

This invention is designed to provide a cheaper construction, and also furnish a device that will allow the blocking attachment to maintain its position on the floor, but will allow the truck to be turned on its axle without moving either the wheels or the blocking attachment. This being possible by reason of a sliding connection between the blocking attachment and the axle of the truck.

Another feature of the invention is a more simple construction of eccentric device to actuate the blocking attachment.

The invention is illustrated in the accompanying drawings, in which

Figure 1 is a side view of a truck showing my blocking attachment in both its normal and operated positions, and Fig. 2 shows the same, but with the truck tilted. Fig. 3 is a side view of the eccentric portion of the device, and Fig. 4 is a section on line 4, 4, in Fig. 3. Fig. 5 is a broken plan view of the blocking bar showing the sliding connection, and Fig. 6 is a section on line 6, 6, in Fig. 5.

I show the usual form of hand truck having the main body portion 10, the handles 11, the guard 12, and the wheels 13 revolving on the axle 14. Intermediate of the two side pieces of the main body portion 10, are the eccentrics made up of the casing 15 having the end flanges 16, and being blocked against the axle 14 by means of the sheet metal key 17. This key is struck up to provide a surface 18 to fit the inside of the casing 15, and with the tapered portion 19 to bear on one corner of the square axle 14. This attachment insures the turning of the casing 15 with the shaft 14. Swinging loosely on this casing 15 is the strap 20, having the arm 21 normally held upward by the spring 22 which has one end turned above the arm that has the opposed end 23 looped into a hook 24, cast or secured on one of the flanges 16, as will be more fully seen from Fig. 3. On the outer end of the arms 21, these eccentrics being arranged in pairs, is arranged the block 25 that is operated by the foot and travels in the path shown in Fig. 1, to block the wheels of the truck so that when a weight is being lifted by the guard 12, and the handle 11 is used as a lever, the axle will become a fixed fulcrum. The action of the axle, however, is shown in Fig. 2 which shows that the eccentric is acting at the same time, and if the block 25 were rigidly secured to the arm 21, either the block or the wheel would have to move, and if this were difficult, on account of an uneven surface, the tilting of the truck would be a very hard matter. To overcome this difficulty, I arrange the ends of the bars 21 in the flattened portions 26, that are provided with the slots 27 into which are arranged the springs 28. These springs normally hold the block on the outer extremity of the flattened portion 26, by reason of the pressure of the springs on one end, and a pin 29, this pin having a nut 30, the whole tending to clasp the sleeve 31 to the bar or block 25.

It will be evident that in the tilting of the truck, the power of the eccentric is tending to throw the bar 25 away from the wheel, then this will be taken up by the spring 28, and the flattened portion 26 will slide in the sleeve 31, thus allowing the block 25 to continue to engage the wheels 13.

Having thus described my invention, what I claim is:—

1. A blocking attachment for hand trucks comprising a block, arms for eccentrically securing the block in relation to the wheels, sleeves on the block, the ends of the arms arranged in the sleeves to slide therein, and springs in the sleeves to hold the block in its normal position.

2. A blocking attachment for hand trucks comprising a block, arms for eccentrically securing the block in relation to the wheels, a sleeve on the block, the ends of the arms being flattened and slotted to fit in the sleeve, and springs arranged in the slots to hold the block in its normal position on the arms.

3. The blocking attachment for hand trucks herein described, comprising eccentrics arranged on the axle of the truck, arms projecting from the eccentrics, a block arranged on the ends of the arms, sleeves to receive the ends of the arms, the ends of the arms being flattened and slotted, bolts passing through the block, through the slots in the arms, and through the sleeves, and springs arranged in the slots, one end of the springs engaging the bolts to hold the block in its normal position.

4. In a blocking attachment for hand trucks, an eccentric casing mounted on the axle of the truck having a projecting hook arranged thereon, a strap arranged on the eccentric to swing thereon, and having a projecting arm for supporting a block, and a spring having one end arranged to engage the arm, said spring encircling the eccentric and having its opposed end bent to engage the hook on the eccentric.

5. In a blocking attachment for hand trucks, an eccentric comprising a casing having circumferential flanges, an interior contour arranged to contact two sides of a square axle of a truck, a hollow key bent to engage the two other sides of the square axle, then bent to project to the inner side of the eccentric, and then being bent concentric to engage this inner side, a block holding arm and strap engaged to swing on the eccentric, and a spring engaging the eccentric and the arm to normally throw the arm upward.

In testimony, that I claim the foregoing, I have hereunto set my hand this 10th day of May 1906.

HENRY L. MYERS.

Witnesses:
E. A. PELL,
WM. H. CAMFIELD.